Feb. 3, 1925.
E. NORDEN
WATER FAUCET
Filed Jan. 15, 1923
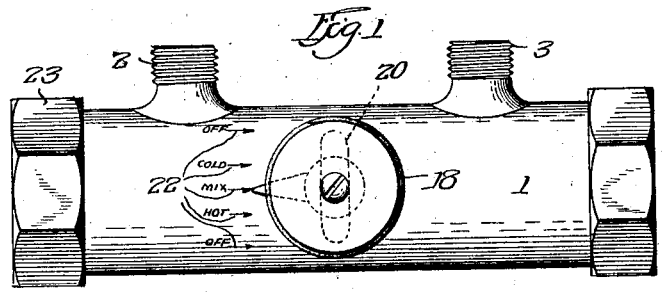
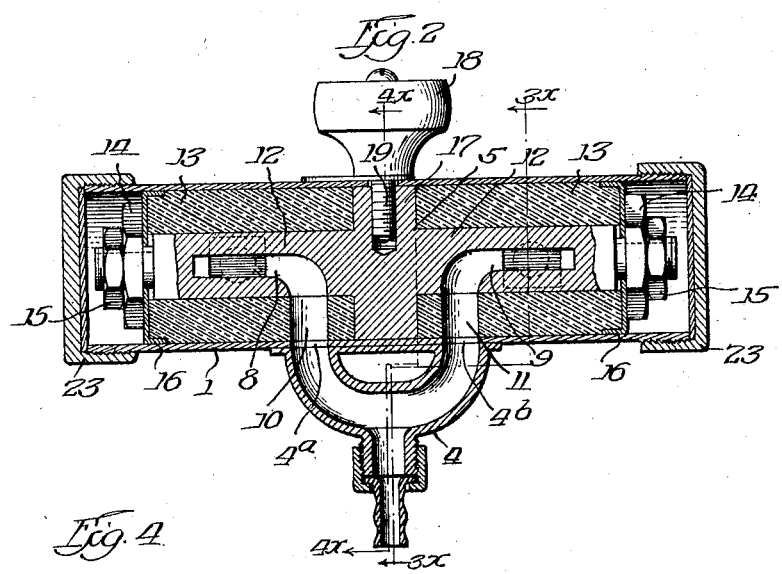
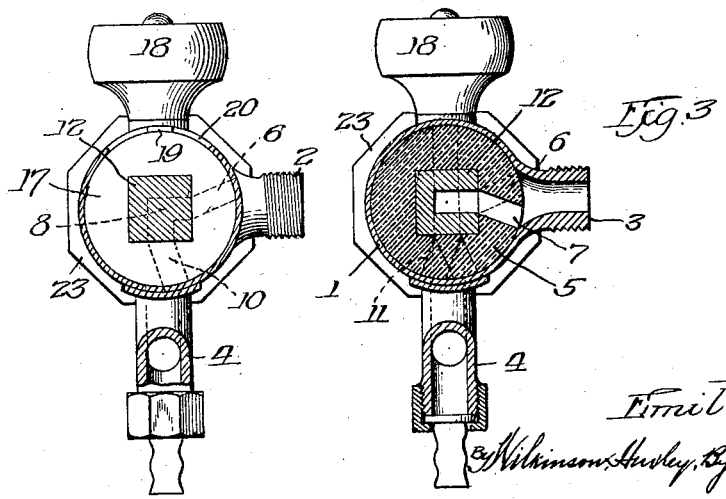
Inventor
Emil Norden Patented Feb. 3, 1925.

1,524,945

UNITED STATES PATENT OFFICE.

EMIL NORDEN, OF CHICAGO, ILLINOIS, ASSIGNOR OF ONE-HALF TO HENRY KELLNER, OF CHICAGO, ILLINOIS.

WATER FAUCET.

Application filed January 15, 1923. Serial No. 612,650.

*To all whom it may concern:*

Be it known that I, EMIL NORDEN, a citizen of the United States, residing at Chicago, in the county of Cook and State of Illinois, have invented certain new and useful Improvements in Water Faucets, of which the following is a specification.

This invention relates to water faucets and while designed primarily for controlling the delivery of hot and cold water separately as well as mixed in any desired proportions, involves features of novelty which are appropriate to water faucets in general. In order to open two different water supplying ports either separately or jointly in varying degrees and delivering to a single discharge port the water thereby released, it is desirable to employ a plug rotating in a shell, but it is extremely difficult, if not impossible, with rotary plugs as heretofore constructed to avoid leakage and waste when the ports are shut off.

The primary object of the present invention is to provide a rotary plug for a valve or faucet which can be maintained in such intimate relation with the shell in which it revolves as to prevent leakage at all times, while leaving the plug free for rotation to bring its passages into registry with the supply and discharge ports of the shell. One feature of the invention accordingly consists in adapting the rotary plug to be pressed into intimate circumferential contact with its surrounding shell, for instance, by making the rotary plug largely of a highly deformable medium, such as rubber, and providing it with means for exerting pressure upon the plug so formed in a direction that will expand it into intimate and water tight contact with the shell.

Another object of the invention is to provide a highly ductile plug of the kind described with suitable supporting, controlling, and sustaining means which adapt it for manipulation when in use. Accordingly, another feature of the invention consists in providing a central sustaining and driving core, preferably with an intermediate hub, which centers it within the shell and receives the means for imparting movement to the plug, and constructing the ductile portion of the plug in the form of relatively thick cylindrical sleeves fitted upon the core on opposite sides of the hub; the ducts of the plug being formed preferably in both the sleeves and the core, and the core and the sleeves which surround it being of conforming non-circular section which holds the two elements against relative circumferential displacement.

Another object of the invention is to provide efficient and convenient means for exerting axial pressure upon the ductile sleeves in order to increase their radial dimension. Accordingly, another feature of the invention consists in providing at the ends of the core pressure caps or followers bearing upon the ends of the sleeves, and nuts threaded upon the ends of the core for setting up the caps or followers to any desired degree; these adjusting nuts being preferably housed on the end of the shell and enclosed by caps threaded upon the ends of the shell.

In the accompanying drawing, in which the preferred embodiment of the invention is shown by way of illustration—

Figure 1 is a top plan view of the hot and cold water mixing faucet embodying the invention.

Figure 2 is a vertical axial section of the same.

Figure 3 is a section on the line $3^x$—$3^x$ of Figure 2; and

Figure 4 is a section on the line $4^x$—$4^x$ of Figure 2.

1 represents a substantially cylindrical shell, 2, 3 represent water supply connections or ports delivering into said shell, and 4 represents a twin delivery connection or bib through which said shell discharges. Located within the shell 1 is a rotary plug 5 having ducts 6 and 7 adapted to be brought, by rotation of the plug, into communication, respectively, with the ports 2 and 3; said ducts 6 and 7 being so related to the circumference of the plug 5 and of such dimension in the direction of said circumferenece that they can be brought simultaneously into communication with their ports 2 and 3, or either can be presented to its port to the exclusion of the other. Ducts 6 and 7 extend inwardly, as shown in Figure 3, until they meet passages 8 and 9 extending longitudinally of the plug 5, whence they extend through substantially radial passages 10 and 11 to the ports $4^a$ and 4ᵇ of the twin bib 4. Passages 10 and 11 are of such dimension in the direction of the circumference of the plug 5 that each will maintain communication with the bib 4 so long as any portion of the corresponding port 6 or 7 is open to the supply port 2 or 3.

In order to maintain a water tight connection at all times between the plug 5 and the shell 1, said plug is constructed in part of a central axial core 12 and in part of sleeves 13 of rubber or equivalent material having, under normal conditions, a high coefficiency of deformability; and the ends of the core 12 are threaded to receive nuts 14, preferably secured to their adjustment by jamb nuts 15, for exerting pressure in the direction of the axis of the core upon the sleeves 13; a follower or cap 16 being interposed between each nut 14 and its sleeve to distribute the pressure uniformly over the entire end area of the sleeve, and thereby enlarge the radial or circumferential dimension of the sleeve and cause it to intimately contact with the internal bore of the shell 1 and effect a water tight closure at all times. Core 12 is preferably constructed with an intermediate hub 17 which fits the internal bore of the shell 1, provides an abutment for sustaining the sleeves 13 under axial compression imposed upon them by the nuts 4, and receives a handle 18 through which the plug is rotated in the shell; said handle being connected with the hub 17 through means of the shank 19 that traverses the slot 20 of the shell, and being provided if desired with an indicator 21 co-acting with calibrations 22 expressive of the different phases established by the rotation of the plug.

The ends of the shell 1 preferably extend axially beyond the positions assumed by the nuts 14 and 15, and are fitted with readily removable closing caps 23 so as to effectually house the adjusting nuts while rendering them readily accessible in case it becomes necessary to impose additional pressure upon the sleeves 13 to check leakage.

From the foregoing description it will be seen that I have provided a water faucet comprising a shell having inlet and outlet ports for water, and a plug fitted for rotation in the shell and having ducts adapted to be brought into and out of registry with the ports by such rotation; the inlet ports being duplicated so that they may serve to receive hot and cold water, respectively, and one duct being associated with each of said ports; the plug being constructed of an intermediate member equipped for manual rotation and a pair of members in which the ducts are formed, receiving rotation from said intermediate member but adjustable axially in relation thereto for the purpose of tightening their fit within the shell; and the shell being provided with means for imparting such axial adjustment.

I claim:

1. In a water faucet, a shell having inlet and outlet ports, and a plug fitting within said shell and having ducts adapted to be brought into registry with said ports by rotation of the plug; the portion of said plug through which it fits the shell being constructed of material that is readily deformable; and means being provided for imposing pressure thereon in a direction to develop radial pressure between the plug and the shell.

2. In a water faucet, a shell, and a plug fitting within the shell and having ducts for the flow of water that are opened and closed by the rotation of the plug within the shell; said plug comprising a core, a surrounding sleeve of deformable material through which the plug fits the sleeve, and means for imposing, in the direction of the axis of the plug, pressure upon said sleeve.

3. In a water faucet, a shell, and a rotary plug fitting the shell; said plug comprising a core, a sleeve of deformable material surrounding said core, and means mounted on the end of the core beyond said sleeve for imposing pressure upon the sleeve in the direction of the axis of the core.

4. In a water faucet, a shell, and a rotary plug fitting said shell; said plug comprising a core, a sleeve of deformable material surrounding said core, means sustaining one end of said sleeve in one direction of the axis of the core, and means for imposing pressure upon said sleeve in the opposite direction.

5. In a faucet, a shell, and a rotary plug fitting said shell and having ducts for the flow of water that are opened and closed by the rotation of the plug within the shell; said plug comprising a core, a hub on said core, a sleeve surrounding said core and having abutment at one end against said plug, and means for imposing pressure upon the opposite end of said sleeve.

6. In a faucet, a shell, and a rotary plug fitting said shell and having ducts for the flow of water that are opened and closed by the rotation of the plug within the shell; said plug comprising a core, a hub on said core, a sleeve surrounding said core and having abutment at one end against said plug, and means for imposing pressure upon the opposite end of said sleeve comprising a nut threaded upon the end of the core beyond the sleeve.

7. In a faucet, a shell, and a rotary plug fitting said shell and having ducts for the flow of water that are opened and closed by the rotation of the plug within the shell; said plug comprising a core, a hub on said core, a sleeve surrounding said core and having abutment at one end against said plug, and means for imposing pressure upon the opposite end of said sleeve; said hub fitting within the sleeve and centering the core therein.

8. In a faucet, a shell, and a rotary plug fitting said shell; said plug comprising a core having at an intermediate point a hub that fits the shell and centers the core within it, sleeves surrounding the portions of said core lying on opposite sides of said hub and abutting against the latter, and means for imposing upon said sleeves axial pressure toward said hub.

9. In a mixing faucet, a shell having hot and cold water inlets, and a plug rotating in said shell and having ducts adapted to be brought into registry with said inlets; said plug comprising a core with surrounding sleeves of ductile material through which the plug fits the shell; said ducts extending through said sleeves.

10. In a mixing faucet, a shell having hot and cold water inlets, and a plug rotating in said shell and having ducts adapted to be brought into registry with said inlets; said plug comprising a core with surrounding sleeves of ductile material through which the plug fits the shell; said ducts extending through said sleeves and core.

11. In a water faucet, a shell having water inlet and outlet ports, and a plug fitted for rotation in said shell and having ducts adapted to be brought into and out of registry with said ports by such rotation; said plug comprising a manually rotated member and a member driven thereby but adjustable axially relatively thereto to tighten its fit within the shell; said shell carrying means for imparting such axial adjustment.

12. In a water faucet, a shell having independent inlets for hot and cold water and suitable discharge for water, a plug in said shell comprising an intermediate rotatable portion, and two shell fitting portions receiving rotation from said intermediate portion, but axially adjustable relatively to said intermediate portion to tighten their fit in the shell; said shell fitting portions being constructed with ducts adapted to connect the hot and cold water ports, respectively, with the water discharge of the shell.

Signed at Chicago, Illinois, this 4th day of January, 1923.

EMIL NORDEN.